(12) United States Patent
Tagaya et al.

(10) Patent No.: US 9,540,031 B2
(45) Date of Patent: Jan. 10, 2017

(54) STEERING DEVICE

(71) Applicant: YAMADA MANUFACTURING CO., LTD., Kiryu-shi (JP)

(72) Inventors: Naohiro Tagaya, Kiryu (JP); Toru Ito, Kiryu (JP); Kazuya Akaishi, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 0 days.

(21) Appl. No.: 14/838,110

(22) Filed: Aug. 27, 2015

(65) Prior Publication Data

US 2016/0059879 A1    Mar. 3, 2016

(30) Foreign Application Priority Data

Aug. 30, 2014 (JP) ................................ 2014-176672

(51) Int. Cl.
*B62D 1/184* (2006.01)
*B62D 1/189* (2006.01)
*B62D 1/19* (2006.01)

(52) U.S. Cl.
CPC ............. *B62D 1/184* (2013.01); *B62D 1/189* (2013.01); *B62D 1/192* (2013.01)

(58) Field of Classification Search
CPC .......... B62D 1/184; B62D 1/189; B62D 1/192
See application file for complete search history.

(56) References Cited

U.S. PATENT DOCUMENTS

| | | | | |
|---|---|---|---|---|
| 5,605,351 A | * | 2/1997 | Higashino | B62D 1/184 280/775 |
| 7,735,391 B2 | * | 6/2010 | Osawa | B62D 1/184 280/775 |
| 8,550,497 B2 | * | 10/2013 | Takezawa | B62D 1/184 280/775 |
| 8,826,769 B2 | * | 9/2014 | Takezawa | B62D 1/189 280/776 |
| 8,984,984 B2 | * | 3/2015 | Yokota | B62D 1/18 280/775 |
| 9,187,116 B2 | * | 11/2015 | Yokota | B62D 1/192 |

FOREIGN PATENT DOCUMENTS

| | | |
|---|---|---|
| JP | 2004-009796 A | 1/2004 |
| JP | 2007-302117 A | 11/2007 |

* cited by examiner

*Primary Examiner* — Faye M Fleming
(74) *Attorney, Agent, or Firm* — McGinn IP Law Group, PLLC

(57) ABSTRACT

Provided is a steering device including: a column pipe; an outer column; a fixing bracket; a hanger bracket that is fixedly attached to the column pipe; a biasing member that elastically biases the column pipe upward; a fastening jig; and a guide member which is made from a synthetic resin and has a sliding side portion, which is provided with a buffer protrusion and a bolt shaft hole, and a sliding bottom portion formed at the lower end of the sliding side portion. The buffer protrusion of the guide member 8 is inserted into a telescopic elongated hole in the hanger bracket, the sliding bottom portion abuts against the lower end of the hanger bracket, and a part of the biasing member abuts against the sliding bottom portion 83.

8 Claims, 10 Drawing Sheets

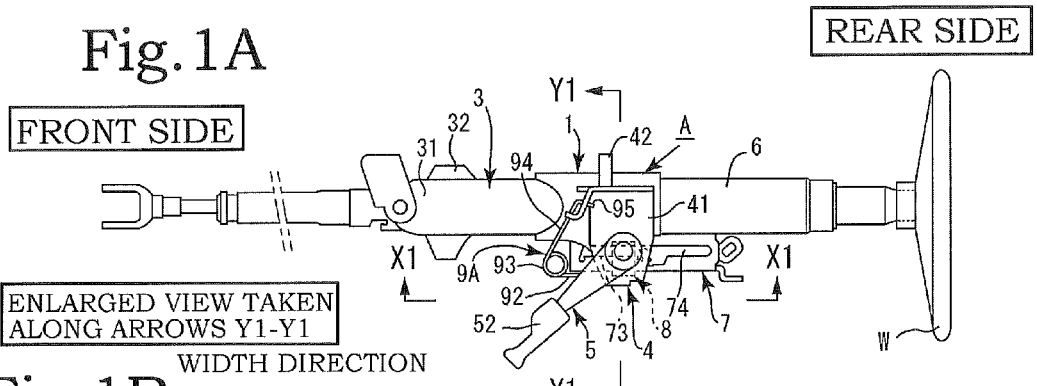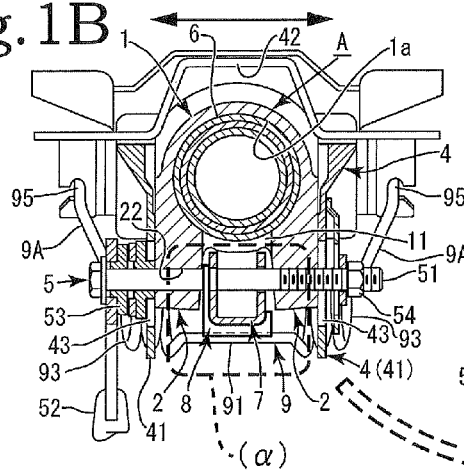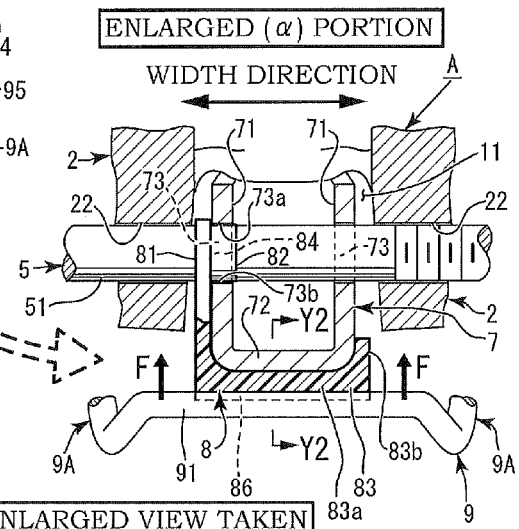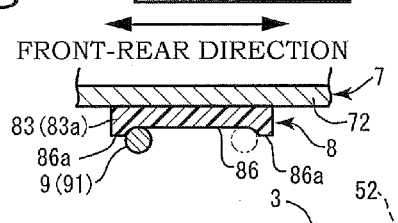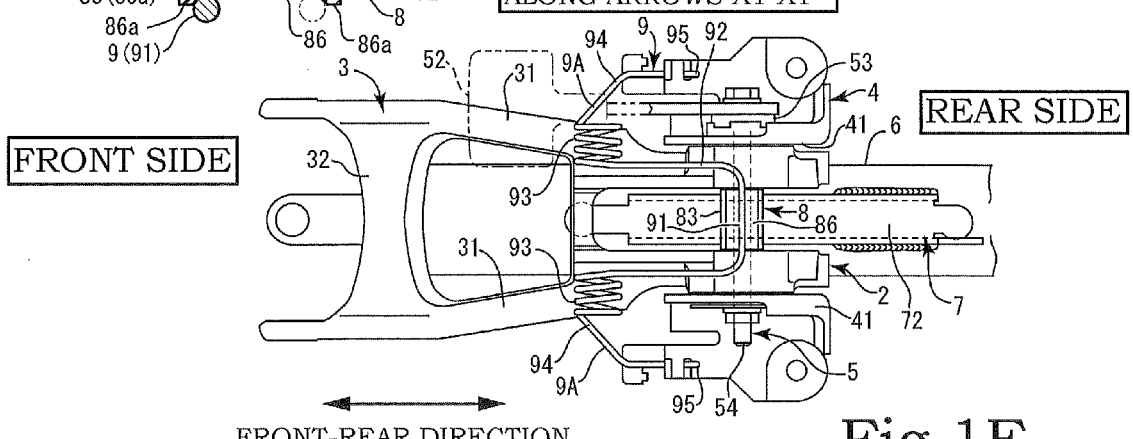

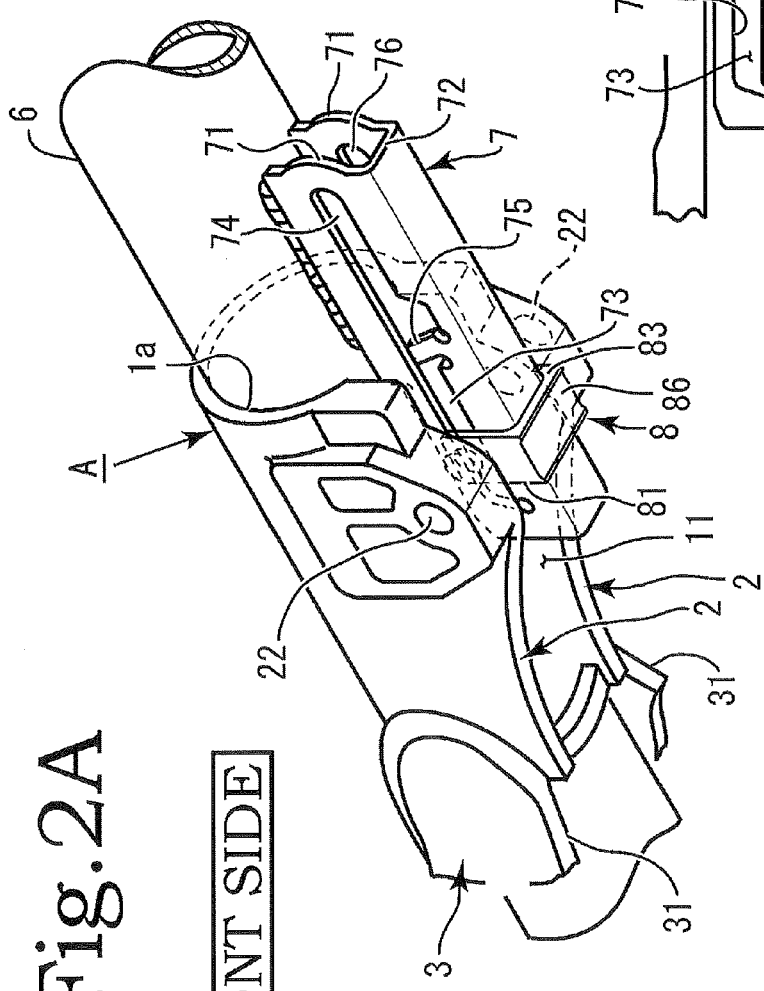
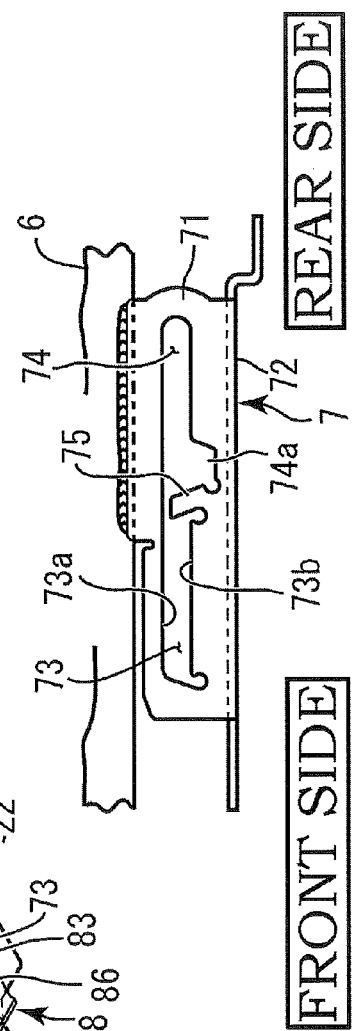

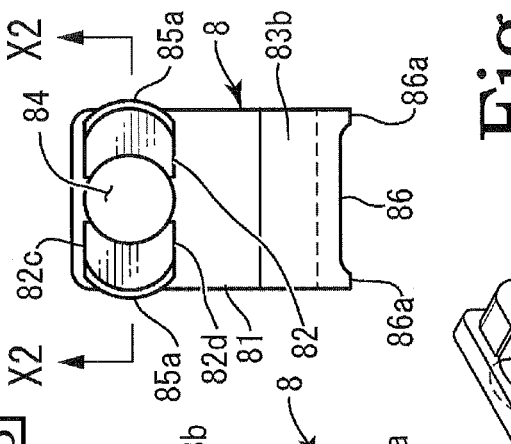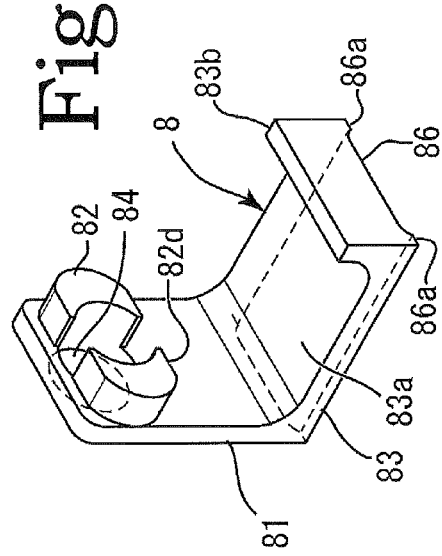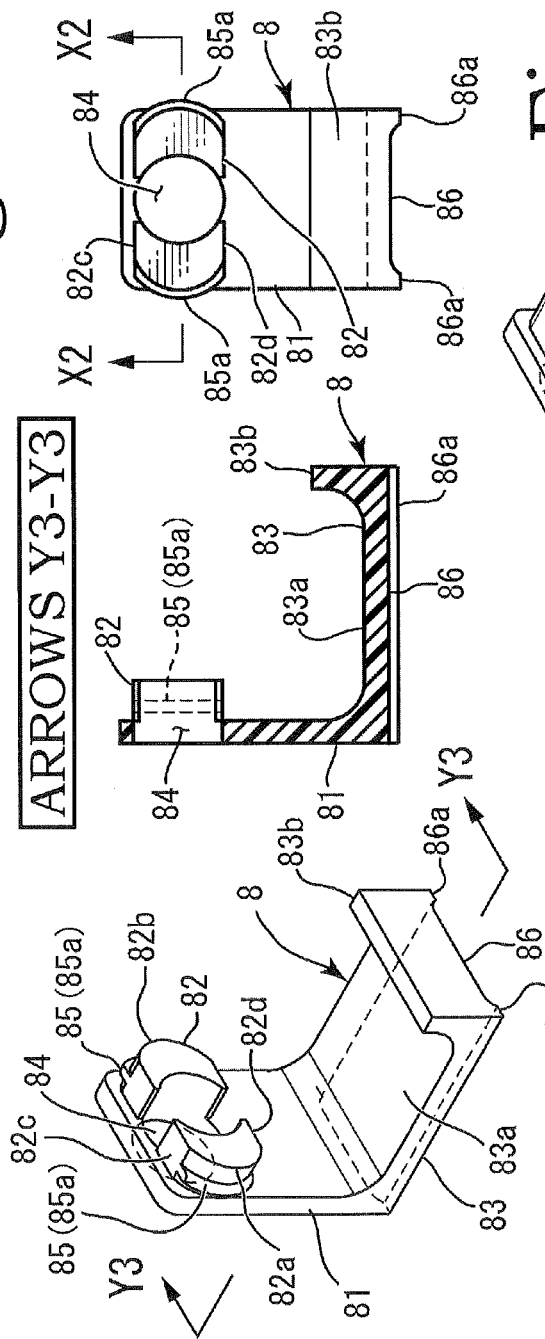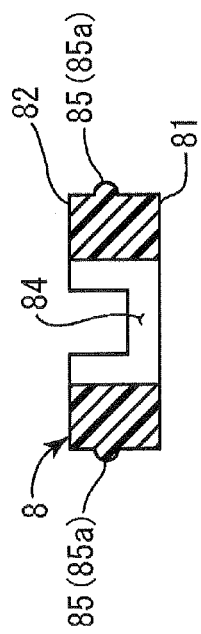

Fig.4A
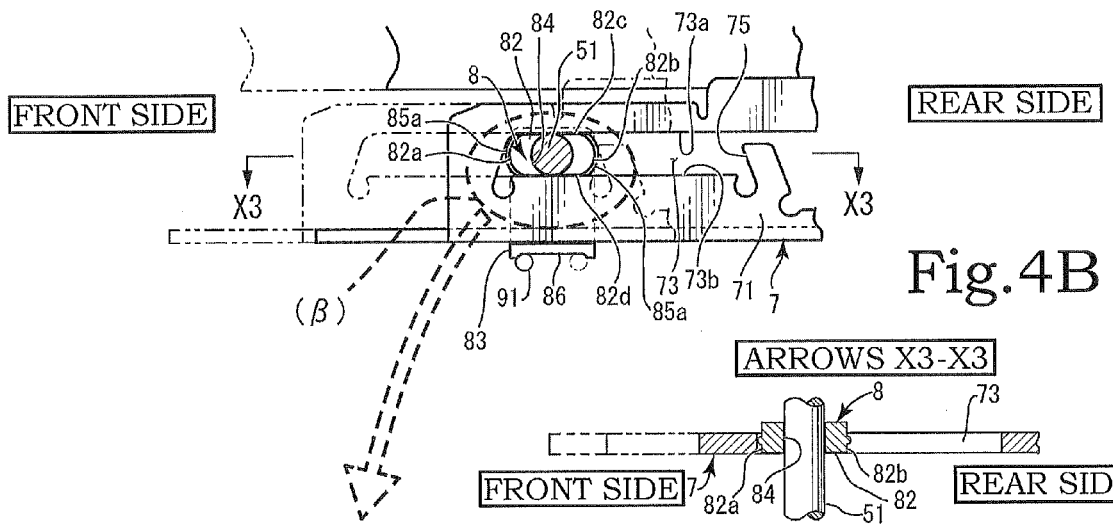
Fig.4B
Fig.4C ENLARGED (β) PORTION
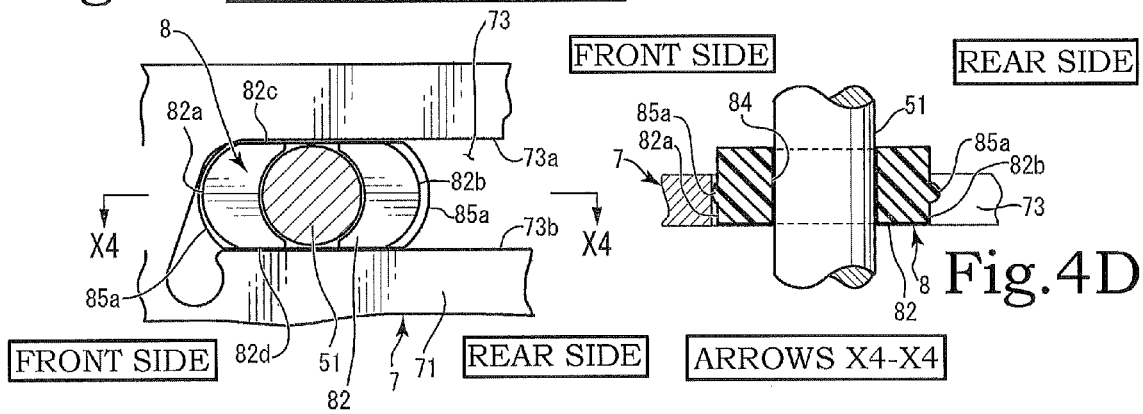
Fig.4D
Fig.4E

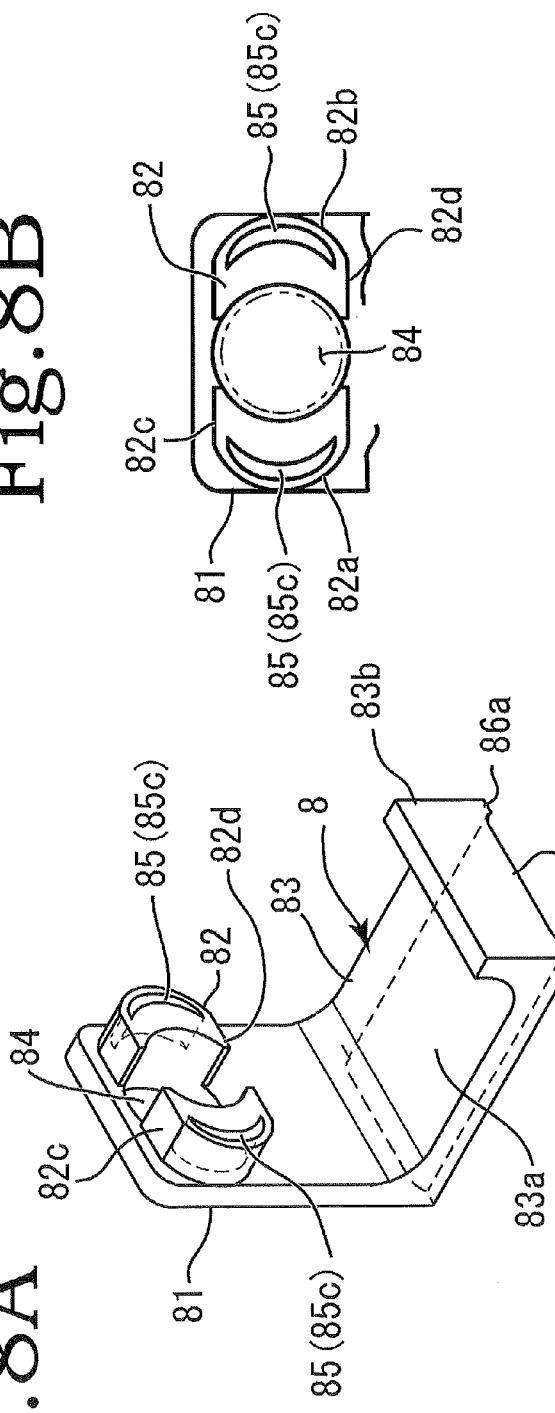
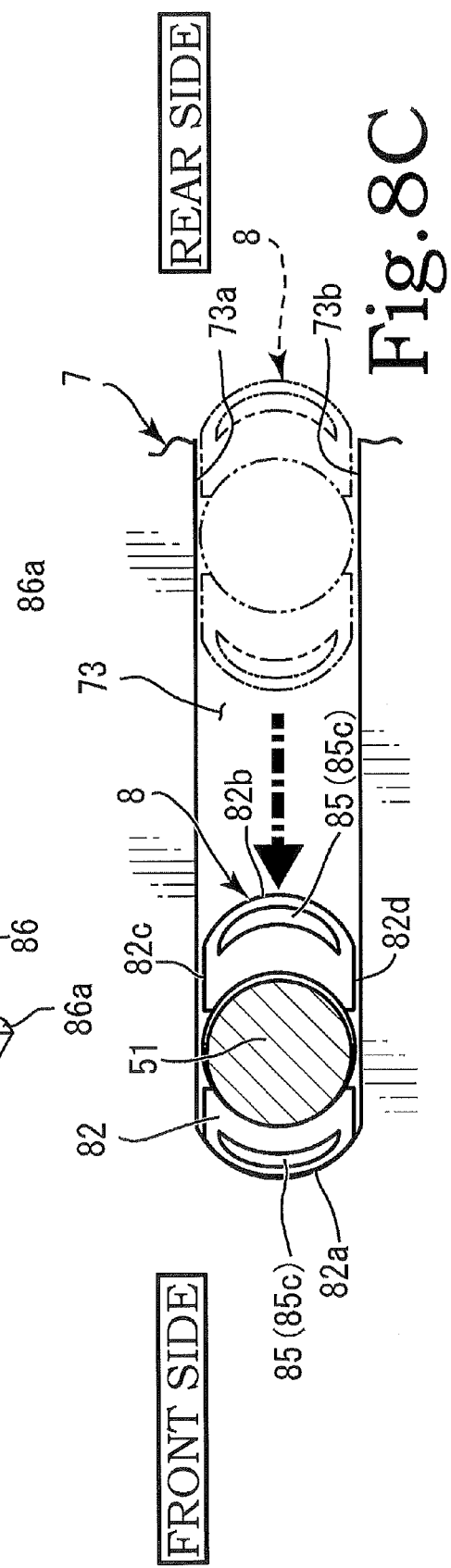

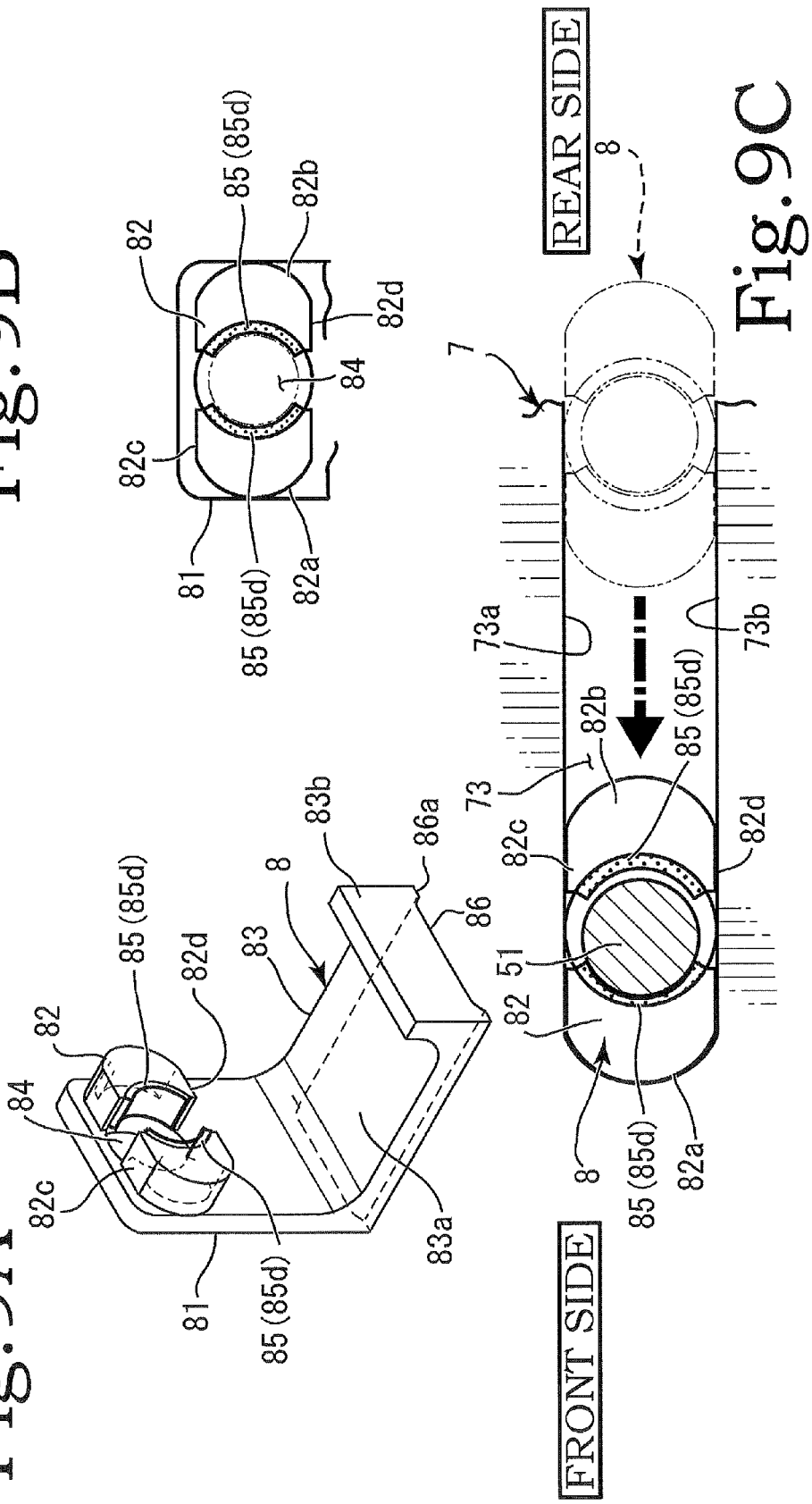

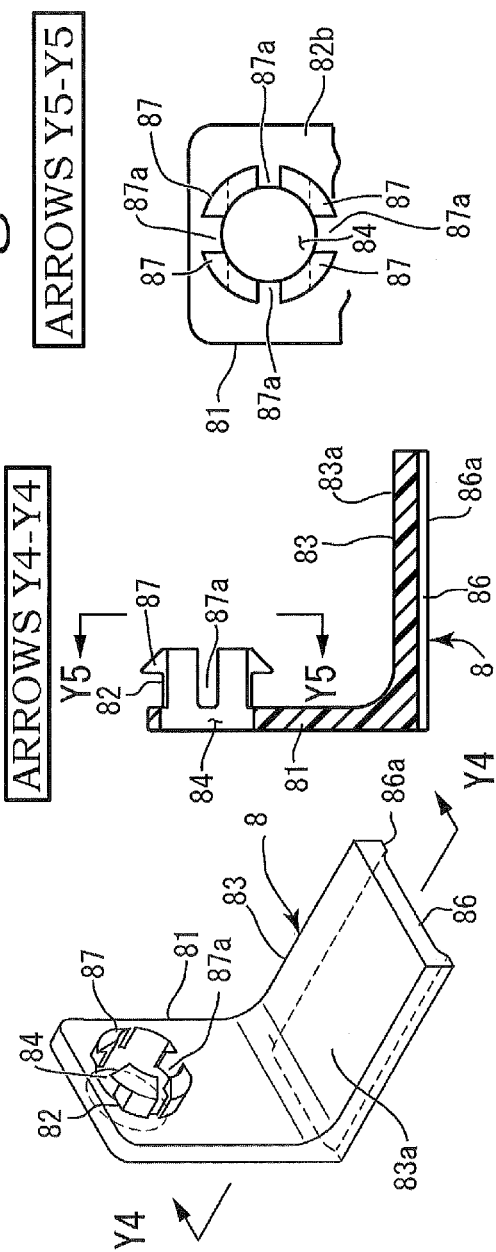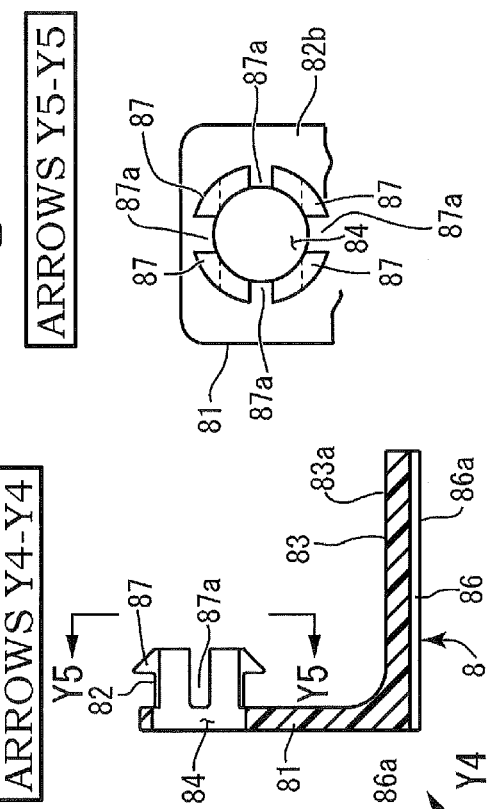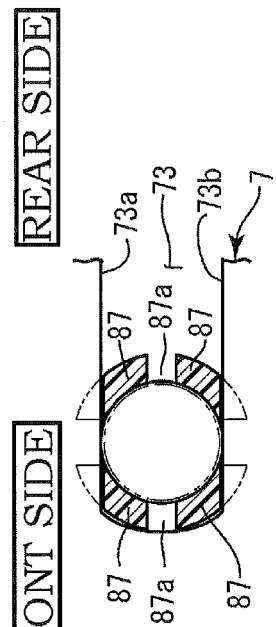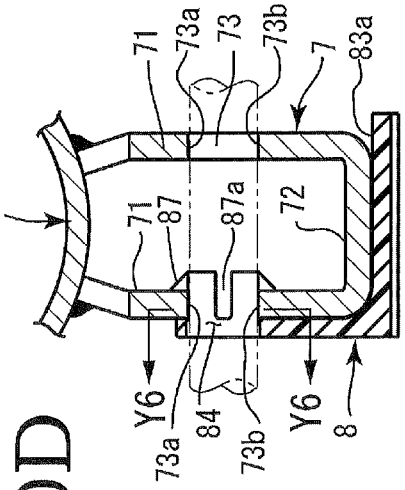

STEERING DEVICE

BACKGROUND OF THE INVENTION

1. Field for the Invention

The present invention relates to a steering device provided with a tilt-telescopic adjustment function and making it possible to reduce shocks and friction caused by the abutment of parts during the tilt-telescopic adjustment and also noise generated at this time and to obtain good operation feeling.

2. Description of the Related Art

A variety of manual steering devices equipped with a tilt-telescopic adjustment function has been developed and put to practical use. Various means have been used in such devices to reduce shocks, friction, and occurrence of collision noise caused by sliding and abutment of parts during the tilt-telescopic adjustment.

Japanese Patent Application Publication No. 2007-302117 and Japanese Patent Application Publication No. 2004-9796 disclose specific examples of such means. The disclosures of Japanese Patent Application Publication No. 2007-302117 and Japanese Patent Application Publication No. 2004-9796 will be summarized hereinbelow. The explanation below uses the reference numerals used in Japanese Patent Application Publication No. 2007-302117 and Japanese Patent Application Publication No. 2004-9796. In Japanese Patent Application Publication No. 2007-302117, round openings (recesses) (1c) are formed at both ends of a telescopic elongated hole (1b), and a cylindrical buffer member (6) is fitted into the round opening (1c).

The buffer member (6) formed from a rubber or resin has an outer diameter somewhat larger than the inner diameter of the round opening (1c), and after the buffer member has been assembled by press fitting into the round opening (1c), the buffer member is fixedly held inside the round opening (1c) by the elastic force induced by the elastic deformation thereof. With such a configuration, in Japanese Patent Application Publication No. 2007-302117, a clamp bolt (5) collides with the buffer member (6), rather than with the end surface of the telescopic elongated hole (1b), and the shock force is thus relaxed.

In Japanese Patent Application Publication No. 2004-9796, a biasing end portion (folded portion) (22) of a balance or jump-up spring (20) is in contact with a column-side upper bracket (5). During the telescopic adjustment, the biasing end portion (22) slides over the contact zone of the column-side upper bracket (5). A sliding member (30) from a synthetic resin is mounted on the biasing end portion (22) in order to improve sound absorption and sliding characteristics during the sliding.

The sliding member 30 is formed in a substantially U-like shape and has a clip main body portion (31) (accommodation sliding bottom portion), a contact portion (32), and guide portions (33). The clip main body portion (31) expands against its own elastic recovery force (clip force) to accommodate the biasing end portion (22) (folded portion) on the other side of the spring (20). After the biasing end portion (22) has been accommodated in the expanded sliding member (30), the sliding member (30) is compressed by the elastic recovery force (clip force), and holds the biasing end portion (22) (folded portion) of the spring (20). The contact portion (32) with a convex curved surface comes into contact with the column-side bracket (4), and the other biasing end portion (22) (folded portion) of the spring (20) is fixedly attached by the guide portions (33).

SUMMARY OF THE INVENTION

In Japanese Patent Application Publication No. 2007-302117, the buffer member (6) is mounted, in a substantially press fitted state, in the round opening (1c). Therefore, the assemblability of the buffer member (6) with the round opening (1c) is hardly good. Further, the buffer member (6) is fixedly held inside the round opening (1c) by the elastic force induced by elastic deformation of the buffer member. Therefore, the buffer member (6) can drop out due to repeated abutment of the clamp bolt (5) thereagainst.

In Japanese Patent Application Publication No 2004-9796, during tilt-telescopic adjustment, sound absorption and sliding characteristics in the contact portion of the biasing end portion (22) of the spring (20) and the column-side upper bracket (5) are improved by the sliding member (30), but the sliding member or buffer member is required to be provided separately in the sliding locations of the elongated hole (7) for telescopic adjustment and the fastening bolt (8). As a result, the number of parts and assembling operations is increased.

It is an objective of (technical problem to be resolved by) the present invention to provide a steering device that makes it possible to reduce shocks and friction caused by the abutment of parts during the tilt-telescopic adjustment and also noise generated at this time and to obtain good operation feeling, those effects being obtained with a very simple configuration.

The inventors have conducted a comprehensive research aimed at the resolution of the above-described problems, and the results obtained have demonstrated that the problems can be resolved by the first embodiment of the present invention providing a steering device including: a column pipe that rotatably supports a shaft; an outer column having an embracing main body portion that allows the column pipe to move and to be fixed freely in a front-rear direction and fastening portions that expand/contract the embracing main body portion in a diametrical direction; a fixing bracket having fixing-side portions holding the outer column from two widthwise sides of the outer column; a hanger bracket that is fixedly attached to the column pipe and has a telescopic elongated hole; a biasing member that elastically biases the column pipe upward; a fastening jig having a bolt shaft which is inserted into the fastening portion, the fixing-side portion, and the telescopic elongated hole; and a guide member which is made from a synthetic resin and has a sliding side portion, which is provided with a buffer protrusion and a bolt shaft hole formed in the buffer protrusion, and a sliding bottom portion formed at the lower end of the sliding side portion, wherein the hanger bracket is disposed between the two fastening portions, the buffer protrusion of the guide member is inserted into the telescopic elongated hole, the sliding bottom portion abuts against the lower end of the hanger bracket, and a part of the biasing member abuts against the slide bottom portion.

The above-described problems are also resolved by the second embodiment of the present invention providing the steering device according to the first embodiment, wherein the buffer protrusion of the guide member has an elliptical shape extending in an axial direction. The above-described problems are also resolved by the third embodiment of the present invention providing the steering device according to the first or second embodiment, wherein ribs are formed at the outer circumference of the buffer protrusion of the guide member and in portions abutting against two axially end portions of the telescopic adjustment elongated hole.

The above-described problems are also resolved by the fourth embodiment of the present invention providing the steering device according to the first or second embodiment, wherein a void is formed in the buffer protrusion of the guide member. The above-described problems are also resolved by the fifth embodiment of the present invention providing the steering device according to the first or second embodiment, wherein an elastic member is interposed on the inner circumference of the bolt shaft hole at the buffer protrusion of the guide member. The above-described problems are also resolved by the sixth embodiment of the present invention providing the steering device according to the first or second embodiment, wherein a recess is formed in the lower surface of the sliding bottom portion of the guide member.

The above-described problems are also resolved by the seventh embodiment of the present invention providing the steering device according to the first or second embodiment, wherein a locking rising piece extending upward is formed in the slide bottom portion. The above-described problems are also resolved by the eighth embodiment of the present invention providing the steering device according to the first or second embodiment, wherein a locking projection extending in an up-down direction is provided at the buffer protrusion.

In the present invention, the guide member is made from a synthetic resin and the sliding side portion and sliding bottom portion thereof are formed integrally. Further, the buffer protrusion and the bolt shaft hole through which the buffer protrusion passes are formed at the sliding side portion. The buffer protrusion is inserted together with the bolt shaft into the telescopic elongated hole of the hanger bracket, and the guide member is mounted such that the sliding side portion and sliding bottom portion are in contact with the hanger bracket. As a result, sliding characteristics during the telescopic adjustment are improved and noise caused by collision with the end portion of the telescopic elongated hole can be prevented.

Further, part (pressing shaft portion) of the biasing member which elastically biases the column pipe upward at all times elastically pushes upward the lower surface of the sliding bottom portion of the guide member. As a result, the guide member is pushed upward, the column pipe to which the hanger bracket has been fixedly attached is pressed against the outer column, and the backlash of the column pipe is prevented.

Further, as a result of the guide member being pushed upward by the biasing member, a state is assumed in which the lower side of the bolt shaft hole is pressed against the bolt shaft, and the backlash of the bolt shaft can be prevented. The guide member has the buffer protrusion, sliding side portion, and sliding bottom portion which are formed integrally from a synthetic resin. Further, the buffer member relating to sliding of the bolt shaft and the telescopic elongated hole of the hanger bracket and the buffer member relating to sliding of the lower end of the hanger bracket and the biasing member are constituted as a single member. As a result, the number of parts and assembling operations is reduced and the hanger bracket and guide member can be assembled by a simple operation.

Further, as mentioned hereinabove, the guide member is formed from a synthetic resin and configured to be disposed between the biasing member and hanger bracket. Therefore, contact between the metal parts is eliminated. As a result, unpleasant noise caused by the metal parts rubbing against each other can be prevented and sliding characteristics during the telescopic adjustment are improved.

BRIEF DESCRIPTION OF THE DRAWINGS

FIG. 1A is a side view illustrating the present invention; FIG. 1B is an enlarged view taken along the Y1-Y1 arrows in FIG. 1A; FIG. 1C is an enlarged view of the (a) portion in FIG. 1B; FIG. 1D is a cross-sectional view taken along the Y2-Y2 arrows in FIG. 1C; and FIG. 1E is an enlarged view taken along the X1-X1 arrows in FIG. 1A;

FIG. 2A is a principal perspective view of the configuration obtained by assembling the outer column and a column pipe, with a hanger bracket mounted thereon, in the present invention; and FIG. 2B is a principal side view of the column pipe and hanger bracket;

FIG. 3A is a perspective view of a guide member in the first embodiment FIG. 3B is a cross-sectional view taken along the arrows Y3-Y3 in FIG. 3A; FIG. 3C is a side view of the guide member; FIG. 3D is an enlarged view taken along the X2-X2 arrows in FIG. 3C; and FIG. 3E is a perspective view of the embodiment in which a buffer auxiliary portion is not provided at the buffer protrusion;

FIG. 4A is a principal enlarged cross-sectional view illustrating a state in which the guide member of the first embodiment is mounted in the telescopic elongated hole of the hanger bracket and abutted against the front end portion; FIG. 4B is a cross-sectional view taken along the X3-X3 arrows in FIG. 4A; FIG. 4C is an enlarged view of the (β) portion depicted in FIG. 4A; FIG. 4D is a cross-sectional view taken along the X4-X4 arrows in FIG. 4C; and FIG. 4E is a principal enlarged view illustrating the state in which the collapsible portion is collapsed by the guide member;

FIG. 8A is a perspective view illustrating the variation example of the second embodiment of the guide member; FIG. 8B is a principal side view of the buffer protrusion location depicted in FIG. 8A; FIG. 8C is a principal enlarged side view illustrating a shock absorption state in the telescopic adjustment performed with the guide member of the variation example of the second embodiment;

FIG. 9A is a perspective view illustrating the third embodiment of the guide member; FIG. 9B is a principal side view of the buffer protrusion location depicted in FIG. 9A; FIG. 9C is a principal enlarged side view illustrating a shock absorption state in the telescopic adjustment performed with the guide member of the third embodiment; and FIG. 10A is a perspective view illustrating the fourth embodiment of the guide member; FIG. 10B is a cross-sectional view taken along the arrows Y4-Y4 in FIG. 10A; FIG. 10C is a view taken along the arrows Y5-Y5 in FIG. 10B; FIG. 10D is a cross-sectional view illustrating the state in which the guide member of the fourth embodiment is mounted on the hanger bracket; and FIG. 10E is a cross-sectional view taken along the arrows Y6-Y6 in FIG. 10D.

Figure 5:
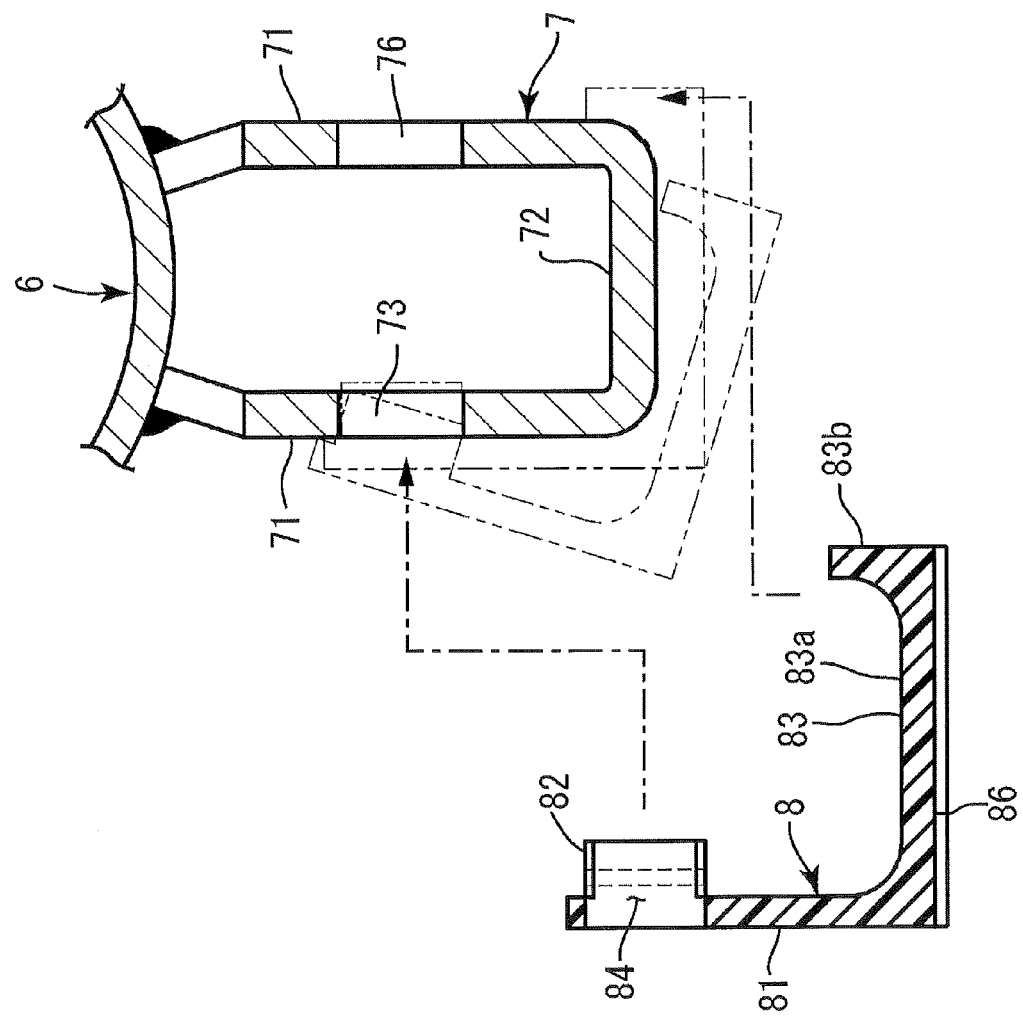
FIG. 5 is an enlarged vertical sectional front view illustrating the state in which the hanger bracket and the guide member are separated.

DESCRIPTION OF THE PREFERRED
EMBODIMENTS

The embodiments of the present invention will be explained hereinbelow with reference to the drawings. In the explanation below, the terms "front-rear direction", "front side", "rear side", and "width direction" are used to represent directions. The front-rear direction is defined on the basis of the automobile body. The front side and rear side are defined by taking the front wheel side of the automobile as the front side and the handle (steering wheel) W side as the rear side in a state in which the steering device in accordance with the present invention is mounted on the automobile. The width direction is defined as a left-right direction perpendicular to the front-rear direction. The front-rear direction of the steering device can be also referred to as axial direction.

The principal configuration in accordance with the present invention is constituted, as depicted in FIG. 1, by an outer column A, a fixing bracket 4, a fastening jig 5, a column pipe 6, a hanger bracket 7, a guide member 8, and a biasing member 9. The outer column A is constituted by an embracing main body portion 1 and a fastening portion 2 (see FIGS. 1A, 1B, and 1E).

The embracing main body portion 1 is formed in a substantially cylindrical shape, more specifically, has an embracing inner circumferential surface portion 1a formed to have a hollow interior shape. A slit portion 11 is formed at the diametrically lower side of the embracing main body portion 1 (see FIGS. 1B, 1E, and 2A).

The slit portion 11 is a separated portion which is discontinuous in the width direction from the axially front side of the embracing main body portion 1 along the rear side. The opposing edge sections at both widthwise sides of the slit portion 11 are provided close to each other, thereby making it possible to reduce the diameter of the embracing inner circumferential surface portion 1a and tighten and lock (fix) the column pipe 6 that is accommodated and mounted inside the embracing main body portion 1.

The embracing inner circumferential surface portion 1a of the embracing main body portion 1 is formed to be slightly larger in the outer diameter than the column pipe 6 so that the column pipe 6 could slide easily in a lock release state. Further, the embracing main body portion 1 is formed to a length such that a substantially intermediate zone in the axial direction of the column pipe 6 could be stably supported. The column pipe 6 protrudes from the axially front end and rear end of the embracing main body portion 1.

The tightening portions 2 are formed integrally with the lower portion of the outer column A, as depicted in, for example, FIGS. 1B, 1E, and 2A. The two tightening portions 2 each have a left-right symmetrical shape and are formed integrally at the widthwise end positions of the slit portion 11. More specifically, the tightening portions are of a thick-plate shape formed substantially vertically down from the widthwise ends of the slit portion 11 or from the vicinity thereof.

The fastening portions 2 are sandwiched by two fixing-side portions 41 of the below-described fixing bracket 4. Fastening through holes 22 are formed in the two fastening portions 2 along the direction parallel to the horizontal diametrical direction of the embracing main body portion 1 and the direction perpendicular to the axial direction of the outer column A.

An arm portion 3 is formed at the front side, in the front-rear direction, of the embracing main body portion 1, as depicted in FIG. 1E. The arm portion 3 is constituted by two arm-shaped portions 31. The two arm-shaped portions 31 are arranged to form a bifurcated shape, and a connection portion 32 is formed such as to bridge the two arm-shaped portions 31 at positions close to the front ends of the arm-shaped portions 31. The connection portion 32 has a substantially circular shape, and the column pipe 6 is inserted therethrough.

Further, the fixing bracket 4 is constituted by fixing-side portions 41 formed at both widthwise sides and an attachment top portion 42. Adjustment holes 43 (see FIGS. 1A and 1B), which are elongated holes, are formed in a substantially up-down direction or vertical direction in the two fixing-side portions 41. The attachment top portion 42 of the fixing bracket 4 is fixed with a bolt or the like to the predetermined position inside the vehicle. As a result, the steering device is mounted together with the fixing bracket 4 on the vehicle body.

The fastening jig 5 is constituted by a bolt shaft 51, a lock lever portion 52, a fastening cam 53, and a nut 54 (see FIGS. 1B and 1E). A steering shaft is installed inside the column pipe 6, and a steering wheel (handle) W is mounted on the distal end of the steering shaft which protrudes from the rear side of the column pipe 6.

Further, the hanger bracket 7 is constituted by two hanging plate-shaped portions 71 and a bottom plate portion 72. The hanging plate-shaped portions 71 of the hanger bracket 7 are extended in the front-rear direction (axial direction) of the column pipe 6 and arranged to be parallel to each other at a predetermined distance from each other and the diametrically lower side of the column pipe 6. The upper ends of the hanging plate-shaped portions 71 are fixedly attached. The bottom plate portion 72 is formed at the lower ends of the hanging plate-shaped portions 71, and a cross section perpendicular to the longitudinal direction is formed in a substantially reversed bridge shape or angular U-like shape by the hanging plate-shaped portions 71 and the bottom plate portion 72.

A telescopic elongated hole 73 and a shock absorbing elongated hole 74 are formed in the hanging plate-shaped portion 71 (see FIG. 2A). The telescopic elongated hole 73 is a region to be used for telescopic adjustment, and the shock absorbing elongated hole 74 is a region to be used when the steering column moves forward at the time of secondary collision.

The shock absorbing elongated hole 74 has a collapsible portion 75 which absorbs a shock while being collapsed by the collision of the bolt shaft 51 of the fastening jig 5 at the time of secondary collision. The collapsible portion 75 is formed between the telescopic elongated hole 73 and the shock absorbing elongated hole 74 (see FIG. 4). The collapsible portion 75 is shaped as a shaft or rod and formed to protrude from one end side to the other end side, in the up-down direction (direction perpendicular to the longitudinal direction), of the shock absorbing elongated hole 74.

More specifically, the collapsible portion is formed to protrude from the lower end side to the upper end side of the shock absorbing elongated hole 74 (see FIGS. 4A, 4B, and 4C). Alternatively, the collapsible portion can be formed to protrude in the opposite direction, that is, from the upper end side to the lower end side of the shock absorbing elongated hole 74, or can be formed continuously such that the two longitudinal ends thereof are connected at the lower end side and upper end side of the shock absorbing elongated hole 74.

The collapsible portion 75 is collapsed by the pressing force at the time of collision of the bolt shaft 51 during the secondary collision. In the collapsed state, the collapsible portion 75 tumbles from the root portion thereof. In other words, the bolt shaft 51 absorbs a shock in the course of toppling the collapsible portion 75. Therefore, a recess 74a for accommodating the collapsible portion 75 is formed at the rear side of the portion of the shock absorbing elongated hole 74 where the collapsible portion 75 is formed (FIGS. 2B, 4A, and 4E).

As mentioned hereinabove, the hanger bracket 7 is fixedly attached to the column pipe 6, and welding is used as the fixed attachment means. The welding is performed between the upper ends of the hanging plate-shaped portions 71 and the diametrically lower end side of the column pipe 6. The welding may be performed at the upper ends of the hanging plate-shaped portions 71 over the entire body along the axial direction of the column pipe 6, but is preferably performed over the rear side from the axially substantially intermediate position of the hanging plate-shaped portion 71 (see FIG. 2B).

The guide member 8 is mounted together with the bolt shaft 51 of the fastening jig 5 on the hanger bracket 7. The guide member 8 can be embodied in a plurality of forms. In all of the embodiments, the guide member 8 is entirely formed from a synthetic resin and basically constituted by a sliding side portion 81, a buffer protrusion 82, and a sliding bottom portion 83 (see FIGS. 1C and 3, for example). Further, the width direction of the guide member 8 is the same as the left-right direction perpendicular to the front-rear direction of the hanger bracket 7 after the guide member 8 has been mounted on the hanger bracket 7.

In the first embodiment, the sliding side portion 81 is formed in a substantially rectangular plate-like shape. The buffer protrusion 82 is formed to protrude from the surface on one side of the sliding side portion 81 in the direction perpendicular to the surface of the sliding side portion 81. In other words, the buffer protrusion 82 is formed to protrude from the sliding side portion 81 in the width direction of the guide member 8 (see FIGS. 3A, 3B, and 3E, for example).

Further, a bolt shaft hole 84 passing through the buffer protrusion 82 is formed in the sliding side portion 81 at the location of the buffer protrusion 82. The buffer protrusion 82 is formed in a substantially elliptical shape, and the elliptical shape is formed to extend such that the longitudinal direction thereof is the front-rear direction.

A front tip edge 82a and a rear tip edge 82b, each of a semicircular shape, are formed at respective ends in the front-rear direction. A region of a rectangular shape is formed between the front tip edge 82a and the rear tip edge 82b, and an upper surface 82c and a lower surface 82d thereof are formed as horizontal surfaces parallel to each other.

The bolt shaft hole 84 is formed such that both the sliding side portion 81 and the buffer protrusion 82 pass therethrough. The bolt shaft hole 84 is also formed such that the diametrical center thereof is located at the central position, in the front-rear direction, of the buffer protrusion 82 (see FIG. 3). The diameter of the bolt shaft hole 84 is equal to the distance between the upper surface 82c and the lower surface 82d of the buffer protrusion 82.

The upper surface 82c and the lower surface 82d of the buffer protrusion 82 each have regions which are set apart from each other in the front-rear direction (see FIGS. 3A and 3C). Further, the diameter of the bolt shaft hole 84 can be formed to be less than the distance between the upper surface 82c and the lower surface 82d of the buffer protrusion 82 (this configuration is not depicted in the figures). In this case, the upper surface 82c and the lower surface 82d are each formed as a single flat surface, and there are no regions which are set apart in the front-rear direction.

The sliding bottom portion 83 abuts against the bottom plate portion 72 of the hanger bracket 7 when the guide member 8 is mounted on the hanger bracket 7. The sliding bottom portion 83 is formed such as to form a right angle (inclusive of a substantially right angle) with the sliding side portion 81. Further, a locking rising piece 83b is formed at the edge of the sliding bottom portion 83 on the side opposite that of the sliding side portion 81. The locking rising piece 83b is formed to extend upward perpendicular (inclusive of substantially perpendicular) to the sliding bottom portion 83 and be parallel (inclusive of substantially parallel) to the sliding side portion 81 (see FIGS. 3A and 3B).

In the structure in which the guide member 8 is mounted on the hanger bracket 7, the buffer protrusion 82 of the guide member 8 is inserted into the telescopic elongated hole 73, the sliding side portion 81 abuts against the hanging plate-shape portion 71, and the sliding bottom portion 83 abuts against the bottom plate portion 72 (see FIG. 5). Further, the locking rising piece 83b abuts to be locked against one more hanging plate-shaped portion 71 positioned at a side opposite that of the hanging plate-shaped portion 71 against which the sliding side portion 81 abuts (see FIGS. 1C, 2A, and 5, for example).

In other words, one hanging plate-shaped portion 71 and the bottom plate portion 72 of the hanger bracket 7 are mounted to be embraced by the sliding side portion 81 and a bottom plate piece 83a and the locking rising piece 83b of the sliding bottom portion 83 (see FIG. 1C). As a result, the guide member 8 can be prevented from moving in the width direction with respect to the hanger bracket 7 and can be mounted in a stable state without a backlash. In another example, the locking rising piece 83b is not formed at the guide member 8 (see FIG. 10).

In a state in which the buffer protrusion 82 is inserted into the telescopic elongated hole 73 of the hanger bracket 7, the upper surface 82c and the lower surface 82d of the buffer protrusion 82 are close to or abut against an upper inner circumferential edge 73a and a lower inner circumferential edge 73b of the telescopic elongated hole 73. During the telescopic adjustment, the guide member 8 moves in the front-rear direction in the range of the telescopic elongated hole 73 of the hanger bracket 7. When the buffer protrusion 82 is positioned in the front end portion relative to the telescopic elongated hole 73, the front tip edge 82a of the buffer protrusion 82 abuts against the front end portion of the telescopic elongated hole 73 (see FIGS. 3A, 3C, 4A, and 4C).

When the buffer protrusion 82 is positioned in the rear end portion relative to the telescopic elongated hole 73, the rear tip edge 82b of the buffer protrusion 82 abuts against the rear end portion of the telescopic elongated hole 73. In this case, the rear end portion, in the front-rear direction, of the telescopic elongated hole 73 is the position of the collapsible portion 75, and the rear tip edge 82b of the buffer protrusion 82 abuts against the collapsible portion 75.

In a state in which the bolt shaft 51 of the fastening jig 5 inserted into the bolt shaft hole 84 of the guide member 8 is inserted into the telescopic elongated hole 73, the buffer protrusion 82 is present between the bolt shaft 51 and the telescopic elongated hole 73 (see FIGS. 4A and 4C). The guide member 8 serves to guide for enabling smooth relative movement of the bolt shaft 51 and the telescopic elongated hole 73 during the telescopic adjustment and also to reduce the collision noise and moderate the shock when the bolt shaft 51 abuts against the front end portion and rear end portion, in the front rear direction, of the telescopic elongated hole 73.

A buffer auxiliary portion 85 is formed at the buffer protrusion 82 of the guide member 8. The buffer auxiliary portion 85 can be embodied in a plurality of forms, and in the first embodiment thereof, ribs 85a are formed at the buffer protrusion 82 (see FIGS. 3A, 3C, and 3D). The ribs 85a are deformable regions made from a synthetic resin and formed as fine linear projections.

The rib 85a is formed at the front tip edge 82a and the rear tip edge 82b of the buffer protrusion 82 (see FIGS. 3A, 3C, and 3D). When the buffer protrusion 82 abuts against the front end portion and rear end portion, in the front-rear direction, of the telescopic elongated hole 73, the rib 85a is the first to abut, and the rib 85a is deformed. Since the rib 85a of the buffer protrusion 82 thus initially abuts against the front end portion and rear end portion, in the front-rear direction, of the telescopic elongated hole 73, and then the entire buffer protrusion 82 abuts, the shock occurring at the time of abutment can be absorbed in two stages and the collision noise can be reduced.

Figure 7B:
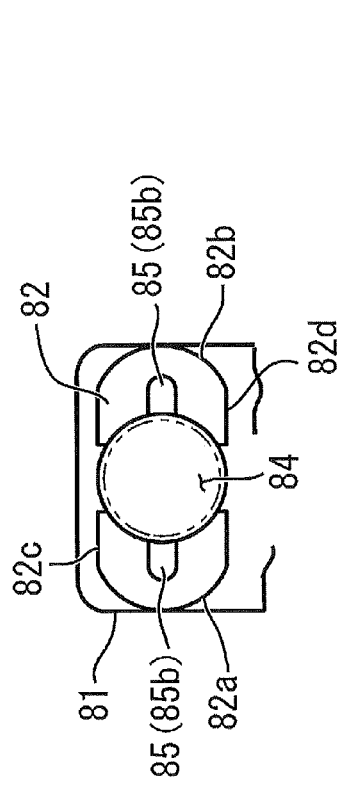
FIG. 7B is a principal side view of the buffer protrusion location depicted in FIG. 7A.
Figure 7A:
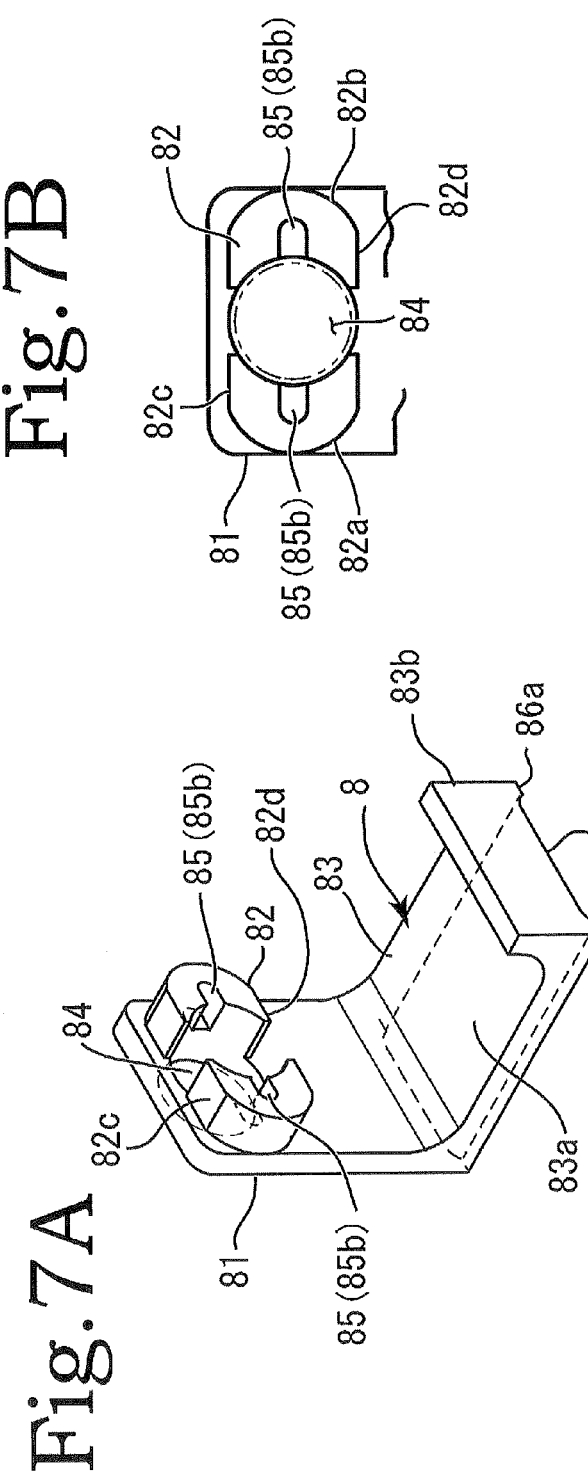
FIG. 7A is a perspective view illustrating the second embodiment of the guide member.

In the second embodiment of the guide member 8, voids 85b are formed in the buffer auxiliary portions 85 (see FIGS. 7A and 7B). The void 85b is formed at both sides in the front-rear direction, with the bolt shaft hole 84 as a center, in the buffer protrusion 82. Therefore, the void is formed as a notch in the inner circumferential side where the bolt shaft hole 84 has been formed. As a result of forming the voids 85b at both sides, in the front-rear direction, of the buffer protrusion 82, the buffer protrusion 82 can be extended and contracted in the front-rear and up-down directions.

Figure 7C:
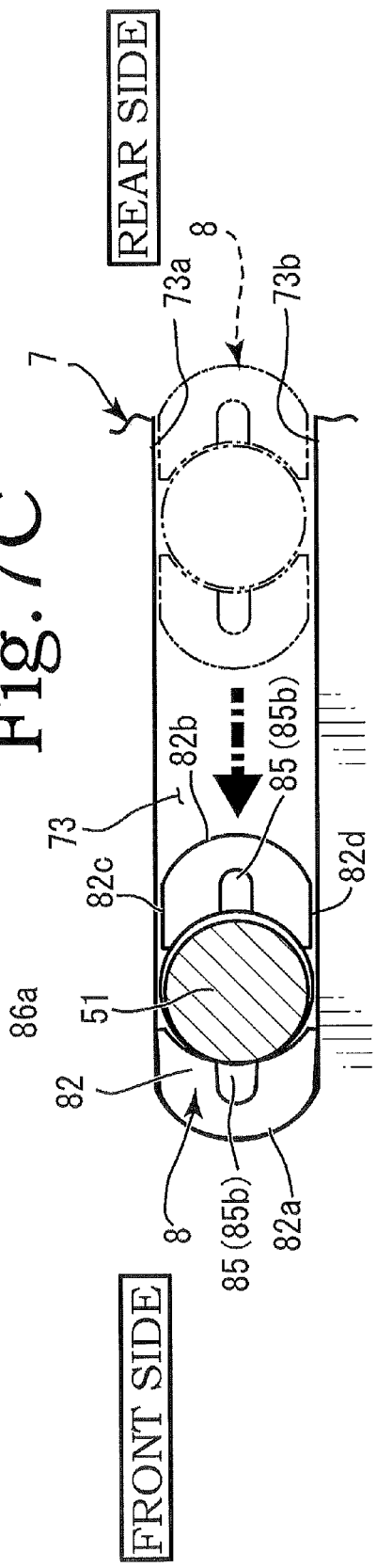
FIG. 7C is a principal enlarged side view illustrating a shock absorption state in the telescopic adjustment performed with the guide member of the second embodiment.

Therefore, when the buffer protrusion 82 is inserted into the telescopic elongated hole 73, although the upper surface 82c and the lower surface 82d of the buffer protrusion 82 abut against the upper inner circumferential edge 73a and lower inner circumferential edge 73b of the telescopic elongated hole 73, the abutment is not that strong, and the buffer protrusion 82 can smoothly move in the front-rear direction of the telescopic elongated hole 73 (see FIG. 7C).

In the modification example of the second embodiment, a cavity-shaped void 85c is formed at both sides, in the front-rear direction, of the buffer protrusion 82 about the bolt shaft hole 84 as a center (see FIGS. 8A and 8B). More specifically the void 85c is formed in a crescent shape such as to have point symmetry with respect to the bolt shaft hole 84 as a center. As a result of contraction of the cavity-shaped void 85c in the buffer protrusion 82, the shock created by the collision can be absorbed and the collision noise can be reduced (see FIG. 8C).

In the third embodiment of the guide member 8, elastic members 85d having elasticity are interposed, as the buffer auxiliary portions 85, between the inner circumference of the bolt shaft hole 84 and the bolt shaft 51 (see FIGS. 9A and 9B). More specifically, the elastic member 85d is a substantially sheet-shaped member constituted by a rubber, a resin, or a flexible and expandable material. For example, a urethane sheet or silicon is used as the elastic member 85d.

The outer circumference of the bolt shaft 51 of the fastening jig 5 is supported, without direct contact, at the inner circumferential surface of the bolt shaft hole 84 by the elastic members 85d mounted on the inner circumference of the bolt shaft hole 84 inside thereof. Further, when the buffer protrusion 82 abuts against the front end or rear end, in the front-rear direction, of the telescopic elongated hole 73, the substantially sheet-shaped elastic member 85d is compressed in the thickness direction. As a result, the shock created by the collision is absorbed and the collision noise can be reduced (see FIG. 9C). Further, the backlash of the bolt shaft 51 can be further suppressed.

The buffer protrusion 82 of the guide member 8 can be also embodied without providing the buffer auxiliary portion 85 such as the above-described ribs 85a or voids 85b (see FIG. 3E). In such an embodiment, when the buffer protrusion 82 abuts against the front end or rear end, in the front-rear direction, of the telescopic elongated hole 73, the buffer protrusion 82 is deformed, thereby making it possible to absorb the shock created by the collision and reduce the collision noise.

In the fourth embodiment of the guide member 8, locking projections 87 are formed at the buffer protrusion 82 (see FIG. 10). More specifically, the locking projections 87 are formed to extend along the up-down direction at the distal end locations of the buffer protrusion 82 in the direction in which the buffer protrusion protrudes from the sliding side portion 81 (the same as the width direction of the guide member 8) (see FIGS. 10A and 10B).

More specifically, the locking projection 87 extends upward from the upper surface 82c and also extends downward from the lower surface 82d of the distal end portions, in the protrusion direction, of the buffer protrusion 82. The locking projection is formed, as a whole, in a substantially flat truncated cone shape (truncated cone). A plurality of slit-shaped portions 87a of a split groove shape is formed in the locking projections 87 (see FIGS. 10A and 10C).

A total of four slit-shaped portions 87a are formed, and the slit-shaped portions 87a are formed such as to constitute a substantially cross-like shape with respect to all of the locking projections 87 (see FIG. 10C). The slit-shaped portions 87a are formed not only in the locking projections 87, but also in parts of the buffer protrusion 82 (see FIGS. 10A and 10B).

The plurality of the slit-shaped portions 87a enable the locking projections 87 to expand/contract elastically in the up-down direction. Further, when the buffer protrusion 82 is inserted into the telescopic elongated hole 73 of the hanger bracket 7, the locking projections 87 are elastically compressed in the up-down direction and can be inserted into the telescopic elongated hole 73.

At the same time as this insertion is completed, the locking projections 87 are elastically opened in the up-down direction so as to restore again the original shape and the mounting on the telescopic elongated hole 73 can be easily completed (see FIGS. 10D and 10E). As a result of the locking projections 87 abutting against the inner side surface of the hanging plate-shaped portion 71, the guide member 8 is prevented from moving in the width direction, a very stable backlash-free state is realized, and a disengagement-resistant configuration is obtained.

With the guide member 8 of the fourth embodiment, the locking projections 87 enable stable mounting on the hanger bracket 7. Therefore, the locking rising pieces 83b formed at the ends, in the width direction, of the sliding bottom portion 83 in the first to third embodiments may be omitted (see FIGS. 10A, 10B, and 10D).

Further, with the configuration in which the locking projections 87 are formed to extend in the up-down direction from the upper surface 82c and the lower surface 82d of the buffer protrusion 82, and the locking projections 87 are not present in the horizontal direction of the buffer protrusion 82 (see FIG. 10E), when the buffer protrusion 82 is abutted against both ends, in the front-rear direction, of the telescopic elongated hole 73, only the buffer protrusion 82 is abutted and the locking projections 87 are not abutted.

A recess 86 can be formed in the lower surface of the sliding bottom portion 83 of the guide member 8 (see FIGS. 1C to 1E, 2A, and 3A to 3C, for example). The recess 86 serves as a stopper for maintaining the state in which a pressing shaft portion 91 of the below-described biasing member 9 abuts against the lower surface of the sliding bottom portion 83 and also for preventing the pressing shaft portion 91 from displacing from the lower surface. The recess 86 is formed to recede in the intermediate location, in the front-rear direction, at the lower surface of the sliding bottom portion 83 (see FIGS. 1D, 2A, 3A, and 3C).

In other words, the recess 86 is created by the formation of wall-shaped pieces 86a, which are perpendicular to the front-rear direction, at both end locations, in the front-rear direction, of the lower surface of the sliding bottom portion 83. The two wall-shaped pieces 86a are formed at both end locations, in the front-rear direction, of the lower surface or formed at the intermediate locations, in the front-rear direction, of the lower surface (this configuration is not shown in the figures). In either case, it is preferred that the wall-shaped pieces 86a be formed at an appropriate distance from each other in the front-rear direction (see FIGS. 1D and 4A).

With such configurations, the pressing shaft portion 91 of the biasing member 9 elastically biases the outer column A upward at all times through the guide member 8. Therefore, when the pressing shaft portion 91 moves up and down, the pressing shaft portion 91 is displaced in the front-rear direction. The positions of the wall-shaped pieces 86a are determined with consideration for the width of such displacement of the pressing shaft portion 91 in the front-rear direction, such that the pieces are spaced by the displacement width or a slightly larger distance.

Further, in the biasing member 9, spring portions 9A are formed at both widthwise sides of the pressing shaft portion 91 (see FIG. 1). As mentioned hereinabove, the biasing member 9 elastically biases the outer column A upward at all times, and serves to prevent the outer column A from abruptly falling down when the lock is released in the tilt-telescopic adjustment.

The spring portions 9A of the biasing member 9 serve to bias elastically the pressing shaft portion 91 upward at all times. The biasing member 9 is formed from a metallic shaft material, and the pressing shaft portion 91 and the spring portions 9A are formed integrally.

In the spring portion 9A, first elastic shaft portions 92 are formed rearward from the front side of the pressing shaft portion 91, return coil spring portions 93 are formed, with a left-right symmetry, at the axial ends on the front side of the two first elastic shaft portions 92, second elastic shaft portions 94 are formed from the two return coil spring portions 93 on the rear side toward the pressing shaft portion 91 side, and locking shaft portions 95 are formed upward from the axial ends on the rear side of the second elastic shaft portions 94.

The biasing member 9 is mounted on the fixing bracket 4, the pressing shaft portion 91 assumes a substantially bridging state or crossing configuration with respect to the two fastening portions 2 of the outer column A, the first elastic shaft portions 92, second elastic shaft portions 94, and two return coil spring portions 93 are positioned on the outer side, in the width direction, of the two fastening portions 2, and the locking shaft portions 95 are locked and fixed to the fixing-side portions 41 of the fixing bracket 4 (see FIGS. 1A, 1B, and 1E).

Further, the pressing shaft portion 91 is abutted against the lower surface of the sliding bottom portion 83 of the guide member 8, which has been mounted on the hanger bracket 7, pushes the column pipe 6 upward, and prevents the steering wheel W from falling down under gravity during the tilting operation. FIG. 10 depicts the state in which an upward biasing force F is caused by the two return coil spring portions 93 to act upon the pressing shaft portion 91.

Figure 6:
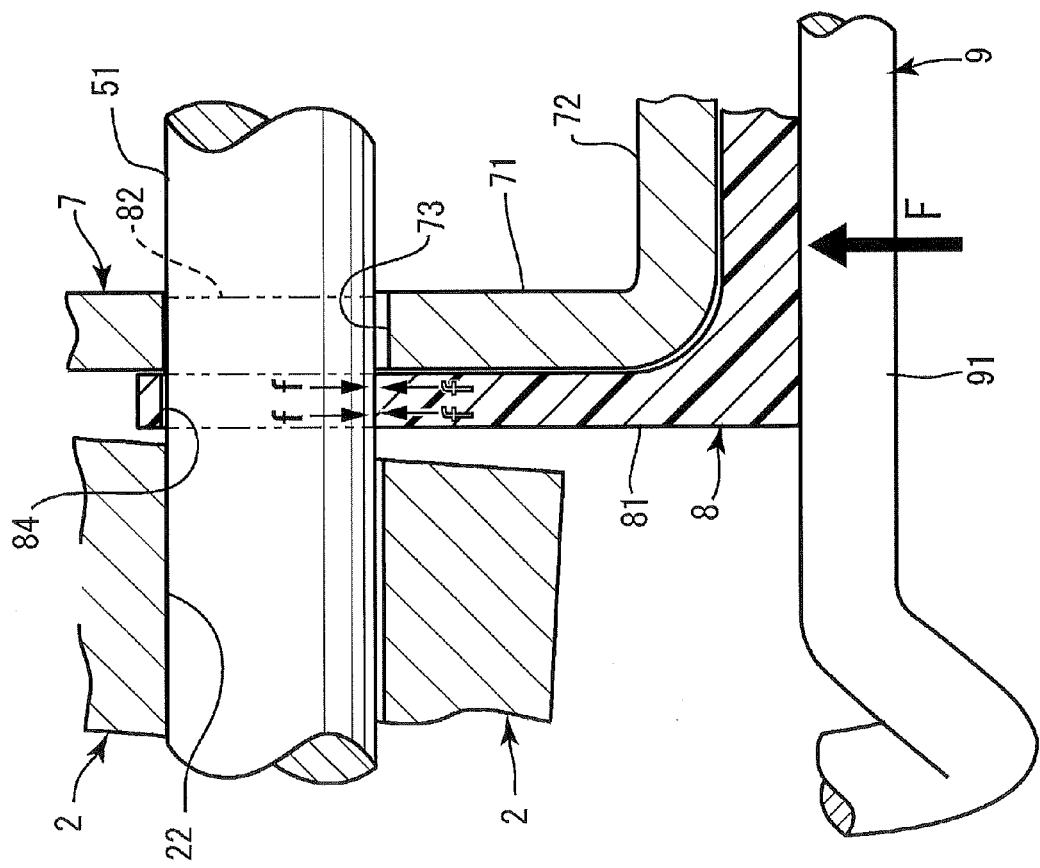
FIG. 6 is a principal enlarged cross-sectional view illustrating the state in which the backlash of the guide member and bolt shaft is prevented by the pressing shaft portion of a biasing member.

The elastic biasing force F acts upward on the pressing shaft portion 91 of the biasing member 9. The pressing shaft portion 91 acts to push upward the guide member 8, the hanger bracket 7, and the column pipe 6 (see FIG. 10). As a result, the lower end surface portion of the bolt shaft hole 84 of the guide member 8 is pressed against the bolt shaft 51 supported by the fastening through holes 22 of the two fastening portions 2 of the outer column A. The state is then assumed (see FIG. 6), in which component forces f acting in the opposite direction are applied such as to press the lower end surface portion of the bolt shaft 51 and the lower end surface portion of the bolt shaft hole 84 against each other, and the backlash of the bolt shaft 51 and the guide member 8 can be prevented.

The process of assembling the main constituent members in accordance with the present invention will be explained below. The column pipe 6 is embraced by the embracing inner circumferential surface portion 1a of the embracing main body portion 1 of the outer column A. The hanger bracket 7 is fixedly attached to the column pipe 6 at the diametrically lower end location thereof. The buffer protrusion 82 of the guide member 8 is inserted into the telescopic elongated hole 73 of the hanger bracket 7, the sliding side portion 81 is abutted against the hanging plate-shaped portion 71 at one side of the hanger bracket 7, the sliding bottom portion 83 abuts against the bottom plate portion 72 of the hanger bracket 7, and the guide member 8 is mounted on the hanger bracket 7.

The two fastening portions 2 of the outer column A are then sandwiched between the two fixing-side portions 41 of the fixing bracket 4. The bolt shaft 51 of the fastening jig 5 is inserted through the adjustment holes 43 of the two fixing-side portions 41, the two fastening through holes 22 formed in the two fastening portions 2, the telescopic elongated hole 73 of the hanger bracket 7, and the bolt shaft hole 84 of the guide member 8, and the bolt shaft is mounted together with the lock lever portion 52 and the fastening cam 53 by using the nut 54 (see FIGS. 1B and 1E).

The fastening cam 53 has a structure that changes in thickness in the axial direction of the bolt shaft 51 following the rotation operation of the lock lever portion 52. As a result of the rotation operation of the lock lever portion 52, a fastening load is generated in the entire fastening jig 5 and the two fixing-side portions 41 of the fixing bracket 4 are pressed to get closer to each other. The fastening portions 2 are pressed by the two fixing-side portions 41, and the two are fastened by the fastening jig 5.

As a result, the gap of the slit portion 11 of the embracing main body portion 1 of the outer column A is narrowed, and the column pipe 6 mounted on the outer column A is locked (fixed) in the axial direction. At this time, the embracing inner circumferential surface portion 1a of the outer column A and the outer circumferential side surface of the column pipe 6 are in a state of contact, and the force generated by friction with the column pipe 6 increases, thereby fixing the column pipe in the axial direction.

Where the fastening of the fastening jig 5 is then released, a gap opens between the two fixing-side portions 41, at the same time, a gap also opens between the two fastening portions 2, the lock of the column pipe 6 of the outer column A is released, the column pipe 6 is moved in the front-rear direction (axial direction), and the telescopic adjustment is enabled.

When the telescopic adjustment is performed, the hanger bracket 7 is moved together with the column pipe 6 in the front-rear direction (axial direction), and the guide member 8 and the outer column A are immovable. The buffer protrusion 82 inserted into the telescopic elongated hole 73 of the hanger bracket 7 moves in the front-rear direction (axial direction) of the hanger bracket 7, thereby sliding relative to the telescopic elongated hole 73. When the buffer protrusion further moves in the front-rear direction of the telescopic elongated hole 73 and abuts against the front end portion or rear end portion thereof, the front tip edge 82a or rear tip edge 82b of the guide member 8 abuts thereagainst and the collision noise at this time can be greatly reduced.

Further, as a result of the upper surface of the sliding bottom portion 83 of the guide member 8 abutting against the bottom plate portion 72 of the hanger bracket 7, the telescopic operability (slidability) of the hanger bracket 7 is improved, and it is possible to improve sliding of the hanger bracket 7 and the pressing shaft portion 91 of the biasing member 9 during the telescopic adjustment and prevent wear and noise at the lower surface.

The sliding bottom portion 83 is then elastically biased upward by the biasing member 9. As a result, the hanger bracket 7 and the column pipe 6 are biased upward and the backlash of the column pipe 6 is prevented. Further, since the guide member 8 is formed integrally, the buffer protrusion 82 is also biased upward at the same time, a gap between the bolt shaft 51 and the bolt shaft hole 84 of the buffer protrusion 82 is narrowed, and the backlash of the bolt shaft can be also prevented. The backlashes of the column pipe 6 and the bolt shaft 51 can be thus prevented at the same time by a single member.

In the second embodiment, the buffer protrusion of the guide member has an elliptical shape extending in the axial direction. As a result, the buffer protrusion and the telescopic elongated hole can abut against each other at both the upper and lower surfaces and the mutual contact area can be increased. As a consequence, the buffer protrusion can move while maintaining a stable state inside the telescopic elongated hole, and the occurrence of backlash of the guide member can be prevented.

In the third embodiment, ribs are formed at the outer circumference of the buffer protrusion of the guide member and at the portions that are to abut against the two axial end portions of the telescopic adjustment elongated hole. As a result, at the time of abutment of the end portion of the telescopic elongated hole and the buffer protrusion of the guide member during the telescopic adjustment, the ribs are first to abut and deform. Therefore, the shock at the time of abutment is moderated and the collision noise can be further reduced.

In the fourth embodiment, voids are formed in the buffer protrusion of the guide member, and at the time of abutment of the end portion of the telescopic elongated hole and the buffer protrusion of the guide member during the telescopic adjustment, the voids are deformed and the outer shape of the buffer protrusion is deformed, thereby making it possible to absorb the shock, moderate the shock at the time of abutment of the end portion of the telescopic elongated hole and the buffer protrusion of the guide member during the telescopic adjustment, and further reduce the collision noise.

In the fifth embodiment, the elastic member is interposed on the inner circumference of the bolt shaft hole at the buffer protrusion of the guide member, thereby making it possible to prevent the backlash of the bolt shaft. Further, at the time of abutment of the end portion of the telescopic elongated hole and the buffer protrusion of the guide member during the telescopic adjustment, the elastic member can absorb the shock, and the collision noise caused by the abutment of the end portion of the telescopic elongated hole and the buffer protrusion of the guide member during the telescopic adjustment can be further reduced.

In the sixth embodiment, the recess is formed at the lower surface of the sliding bottom portion of the guide member. As a result, part of the biasing member is held by the recess, and the biasing member can be prevented from directly abutting against the hanger bracket and generating an unpleasant noise.

In the seventh embodiment, the locking rising pieces are formed to extend upward from the slide bottom portion, and the substantially entire surface of the hanger bracket can be embraced by the sliding side portion, the sliding bottom portion, and the locking rising pieces. As a result, the occurrence of backlash can be prevented when the guide member is widthwise mounted on the hanger bracket, the buffer protrusion inserted into the telescopic elongated hole can be prevented from coming off, a very stable state is realized, and a disengagement-resistant configuration is obtained.

In the eighth embodiment, the locking projections extending in the up-down direction are formed at the buffer protrusion, and the buffer protrusion inserted into the telescopic elongated hole of the hanger bracket can be prevented by the locking projections from coming off, the backlash in the width direction of the hanger bracket is prevented, a very stable state is realized, and a disengagement-resistant configuration is obtained.

What is claimed is:

1. A steering device comprising: a column pipe that rotatably supports a shaft; an outer column having an embracing main body portion that allows the column pipe to move and to be fixed freely in a front-rear direction and fastening portions that expand/contract the embracing main body portion in a diametrical direction; a fixing bracket having fixing-side portions holding the outer column from two widthwise sides of the outer column; a hanger bracket that is fixedly attached to the column pipe and has a telescopic elongated hole; a biasing member that elastically biases the column pipe upward; a fastening jig having a bolt shaft which is inserted into the fastening portion, the fixing-side portion, and the telescopic elongated hole; and a guide member which is made from a synthetic resin and has a sliding side portion, which is provided with a buffer protrusion and a bolt shaft hole formed in the buffer protrusion, and a sliding bottom portion formed at the lower end of the sliding side portion, wherein the hanger bracket is disposed between the two fastening portions, the buffer protrusion of the guide member is inserted into the telescopic elongated hole, the sliding bottom portion abuts against the lower end of the hanger bracket, and a part of the biasing member abuts against the slide bottom portion.

2. The steering device according to claim 1, wherein the buffer protrusion of the guide member has an elliptical shape extending in an axial direction.

3. The steering device according to claim 1, wherein ribs are formed at the outer circumference of the buffer protrusion of the guide member and in portions abutting against two axially end portions of the telescopic adjustment elongated hole.

4. The steering device according to claim 1, wherein a void is formed in the buffer protrusion of the guide member.

5. The steering device according to claim 1, wherein an elastic member is interposed on an inner circumference of the bolt shaft hole at the buffer protrusion of the guide member.

6. The steering device according to claim 1, wherein a recess is formed in the lower surface of the sliding bottom portion of the guide member.

7. The steering device according to claim 1, wherein a locking rising piece extending upward is formed in the slide bottom portion.

8. The steering device according to claim 1, wherein a locking projection extending in an up-down direction is provided at the buffer protrusion.

* * * * *